(No Model.)
J. B. BARDIN.
WAGON BOX.
No. 358,588. Patented Mar. 1, 1887.
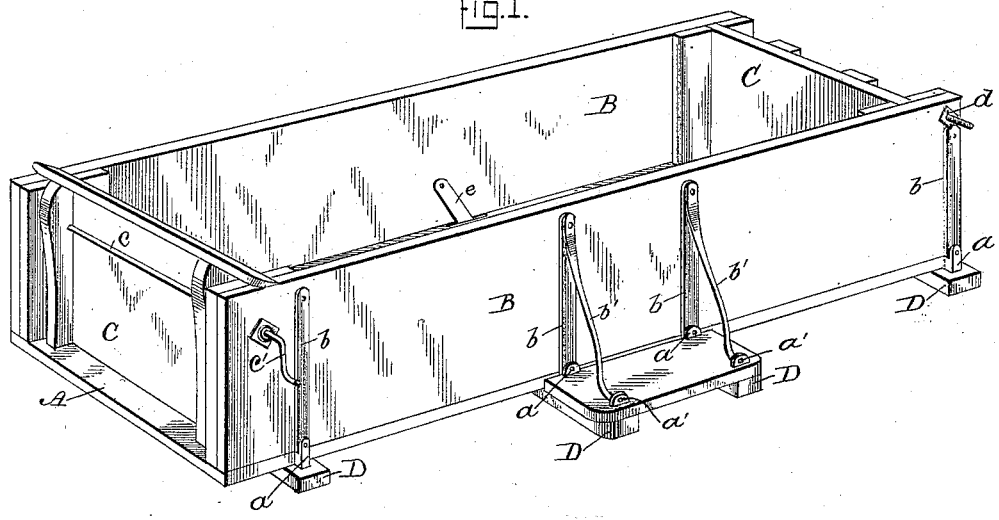
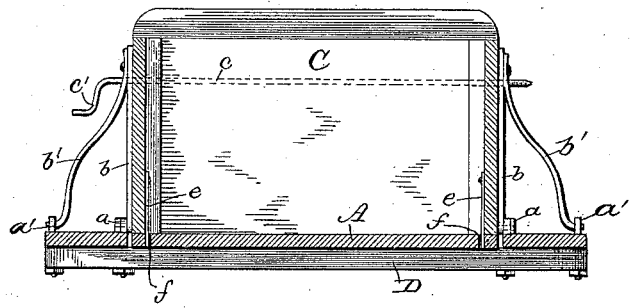
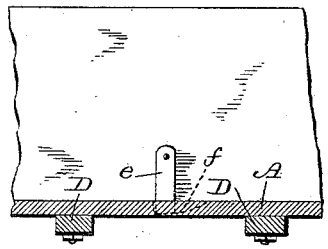
Witnesses:
L. G. Conner, Jr.
Geo. C. Hunting.
Inventor:
John B. Bardin,
by Henry Colert
Atty.

UNITED STATES PATENT OFFICE.

JOHN B. BARDIN, OF FREDERICKSBURG, OHIO.

WAGON-BOX.

SPECIFICATION forming part of Letters Patent No. 358,588, dated March 1, 1887.

Application filed November 3, 1886. Serial No. 217,873. (No model.)

*To all whom it may concern:*

Be it known that I, JOHN B. BARDIN, a citizen of the United States, residing at Fredericksburg, in the county of Wayne and State of Ohio, have invented certain new and useful Improvements in Wagon-Boxes, of which the following is a specification, reference being had therein to the accompanying drawings.

My invention relates to that class of wagon bodies or boxes which have removable endgates and sides, and the object thereof is to provide a wagon-box of this class which may be made with comparative cheapness, and which will be strong and convenient for use.

In the accompanying drawings, Figure 1 is a perspective view of a wagon-box embodying my invention. Fig. 2 is a cross-section thereof, and Fig. 3 is a detail view showing one of the latches for the side-boards.

A denotes the platform or bottom of the wagon-box, the said platform or bottom having beneath it ordinary cross-bars, D, and being in practice placed on the running-gear of the wagon in the usual manner. The sides or side-boards B of the box are removably secured in place by means of bars or bolts $b$, having right-angular outwardly-projecting engaging eyed bolts $a$, attached to the cross-bars D outside of the said sides, the latter being thus adapted to be detached by being moved inwardly to release the hooks from the eyed bolts $a$. To properly steady the side-boards I prefer to provide at or near the middle of the box a set of eyed bolts, $a'$, outside of the eyed bolts $a$, the eyed bolts $a'$ being engaged by the outwardly-curved hooked bars or rods $b'$, which are attached to the bars or rods $b$ near the upper sides of the side-boards.

Care the end-gates, sliding in grooves formed, in the usual manner, by cleats attached to the side-boards and secured in place by rods $c$, having cranked handles $c'$, the ends of said rods opposite said handles being threaded for engagement with nuts $d$, attached to the sideboards B. Thus by inserting one of the rods in place and turning it by its handle it can be quickly screwed into its proper holding position or be easily removed by unscrewing, and as the nuts $d$ are permanently attached to the side-boards, they are not liable to be lost, as sometimes occurs with the ordinary nuts screwed onto the rods.

To prevent the middle portions of the side-boards from moving inward when the wagon-box is empty, and thus becoming disengaged from the holding-eyes, I provide the said side-boards with pivoted latches $e$, which, when turned down to hold said side-boards in place, engage recesses $f$ in the platform A. If it be desirable to remove the side-boards in unloading dirt or other material with which the wagon is to be loaded, the latches $e$ may be turned upward out of the recesses $f$ just before the wagon is loaded, as the material in the wagon-box will (owing to its outward pressure) hold the hooks on the side-boards in engagement with the eyes $a$ and $a'$. In fact, with the end gates in place the latches $e$ may be dispensed with, if desired; but they will be found convenient and useful in many instances.

Having thus described my invention, I claim and desire to secure by Letters Patent—

1. A wagon body or box consisting of a bottom or platform, cross-bars beneath the same, provided with eyed bolts outside of the said bottom or platform, and side-boards having on their outer sides bars or rods provided with outwardly-projecting hooks for engagement with the said bolts, the said hooks being above the lower edges of the said side-boards, combined with suitable end-gates between the said side-boards to hold the latter in place and keep the said hooks in engagement with the said bolts.

2. The combination, with the bottom or platform A, having the recesses $f$, of the cross-bars D, having the eyed bolts $a$, the side-boards B, having bars or rods $b$, provided with outwardly-projecting hooks, the pivoted latches $e$, and the end-gates C.

3. The combination, with the bottom or platform A and its cross-bars D, having the eyed bolts $a$ and $a'$, of the side-boards B, having the bars or rods $b$ and $b'$, provided with outwardly-projecting hooks, and the end-gates C.

In testimony whereof I affix my signature in presence of two witnesses.

JOHN B. BARDIN.

Witnesses:
JAMES E. GROSJEAN,
W. S. PEPPARD.